United States Patent
Drobnik

[15] 3,673,086
[45] June 27, 1972

[54] METHOD OF REMOVING NITRIC ACID, NITRATE IONS AND NITRITE IONS OUT OF AQUEOUS WASTE SOLUTIONS

[72] Inventor: Stephan Drobnik, Eggenstein, Germany

[73] Assignee: Gesellschaft Fur Kernforschung mbH, Weberstrasse, Karlsruhe, Germany

[22] Filed: July 8, 1970

[21] Appl. No.: 53,283

[30] Foreign Application Priority Data

July 11, 1969 Germany......................P 19 35 273.9

[52] U.S. Cl. ........................................210/59, 23/158, 55/74
[51] Int. Cl. ...........................................................C02c 5/02
[58] Field of Search .....................210/59, 50; 23/158; 55/74

[56] References Cited

UNITED STATES PATENTS 2,902,340  9/1959  Olson........................................23/14.5
3,429,103  2/1969  Taylor.......................................55/74 X

OTHER PUBLICATIONS

Healy, T. V. Reactions of Nitric Acid With Formaldehyde, Etc., J. Appl. Chem., Vol. 8, September 1958, pp. 553–561.
Young, G. K., et al., Chemical Reduction of Nitrate in Water, Journal WPCF, Vol. 36, March 1964, pp. 395–398.
Edward, G. P., et al., Determination of Nitrates, Etc., Jour. WPCF, Vol. 34, November 1962, pp. 1112–1116.
Young, G. K., et al., Chemical Reduction of Nitrate in Water, Jour. WPCF, Vol. 36, March 1964, pp. 395–398.

*Primary Examiner*—Michael Rogers
*Attorney*—Spencer & Kaye

[57] ABSTRACT

Nitric acid, nitrate ions and nitrite ions are removed from aqueous radioactive waste solutions by treating such solutions with reducing agent.

10 Claims, No Drawings

METHOD OF REMOVING NITRIC ACID, NITRATE IONS AND NITRITE IONS OUT OF AQUEOUS WASTE SOLUTIONS

The invention relates to a method of removing nitric acid, nitrate ions, and nitrite ions from of aqueous waste solutions, especially from intermediate and high level radioactive solutions in which the waste solutions are treated with reducing agents.

Industrial waste waters containing nitric acid, nitrous acid or their salts in harmful concentrations must not be discharged into streams, rivers or other surface waters acting as main canals, especially not into those which are used for drinking water supplies, without prior treatment. For instance, between 10 and 20 mg/l or more of nitrogen contained in drinking water as nitrate (i.e., between 40 and 90 mg/l nitrate or some $10^{-3}$ M nitrate solution) is regarded as the cause of methemoglobinemia with infants. Moreover, acid concentrations up to a pH of some 4.8 are lethal to carps, 400 to 2,000 mg/l sodium nitrite $NaNO_2$ are the lethal limit for gudgeons, and 10 mg/l nitric acid are detrimental to the growth of radicles of many plants. Waste waters containing nitric acid, $HNO_3$, nitrous acid, $HNO_2$, nitrate or nitrite are produced in metal pickling, nitric acid fabrication (cooling water), production of explosives, in the fabrication of organic dyes, pesticides, or in reprocessing spent nuclear fuels.

Previous methods of treating inactive waste waters were primarily limited to neutralization, clarification, and dilution (F. Meinck, H. Stooff, H. Kohlschutter: "Industrieabwasser", G.B. Fischer Verlag, Stuttgart (1960)). Neutralizing agents included lime solution, chalk dust, and passing the waste water over scrubbing bodies provided with carbonate rock. To some extent acid waste waters were also contacted with copper wastes for the production of copper salts, or nitric acid was blown out of a waste mixture of sulphuric acid and nitric acid by a mixture of steam and air.

For radioactive waste waters, e.g., those produced in plants for the reprocessing of spent nuclear fuels, these methods of treatment are inadequate because the concentration of radionuclides in these waste waters is too high and thus a discharge into surface waters after neutralization and clarification is not permitted. Radioactive waste waters must be decontaminated and/or reduced in volume as far as possible and economically reasonable, e.g., by evaporation, and afterwards reduced to a solid form which is as resistant as possible to leaching of the radioactivity by water or aqueous salt solutions so that the waste solutions can be ultimately disposed of and stored for a long time without a hazard of dangerous radionuclides getting into the biological cycle. Neutralization of acid waste waters with inorganic alkaline solutions, e.g. caustic soda solution, prior to volume reduction through evaporation is expensive, greatly increases the salt content and, hence, the dry residue in the evaporator concentrate and under certain conditions may even result in a reduction of evaporator efficiency with respect to volume reduction and decontamination. Presently, intermediate and high level waste waters, e.g., evaporator concentrates are spray dried and then mixed and melted with raw materials used in glass making. At the relatively high temperatures of the glass melts this results in offgases due to decomposition of some of the nitrates which contain higher nitric oxides, such as $N_2O_3$, $NO_2$, and $N_2O_4$, and volatile radionuclides and/or volatile compounds of radionuclides, such as $RuO_4$. In order to avoid the disadvantages connected with these methods, it was attempted to reduce the contents of nitric acid, nitrate ions, and nitrite ions of the waste water before spray drying by transferring the respective materials first into higher nitric oxides and removing them out of the water in this form and then re-using them for nitric acid recovery. This method is used to feed aqueous formaldehyde solutions or aqueous sugar solutions into waste water which is then heated (U.S. Pat. No. 3,158,577).

This method has some disadvantages. In the case of application of formaldehyde solutions the reaction is hard to control; foaming occurs, and polymerization of the formaldehyde must be anticipated. In the case of application of sugar solutions there is also foaming; if there is an excess of sugar during heating of the drying residue, there may be an explosion. Moreover, the decrease in acid concentration of the decomposition of certain nitrates may give rise to precipitates which deposit on the walls of the reaction vessel and are very hard to remove. Moreover, if the removed higher nitric oxides are absorbed in water, they form diluted contaminated nitric acid and thus possibly generate new radioactive waste.

The invention is based on the problem of removing nitric acid, nitrate ions and nitrite ions from aqueous waste solutions as far as possible and with as little hazard as possible.

In the invention, this problem is solved by feeding the aqueous waste solution into a heated, preferably boiling aqueous solution of a reducing agent. In another embodiment of the invention, the offgases generated in a reaction between a waste solution containing radioactive iodine and the reducing agent, which contain no higher nitric oxides, are led through a filter before they are discharged into the ambient air. The reducing agent employed is an organic substance, i.e. 98 percent formic acid, in at least twice the molar ratio or more relative to the hydrogen ion concentration of the nitric acid bearing waste solution.

The advantages gained with the invention in particular are the fact that the treatment of inactive industrial waste waters containing nitric acid, nitrates or nitrites avoids the expensive neutralization step and thus the great increase in salt content of the waste water and renders unnecessary any dilution to harmless nitrate concentrations with respect to the required prevention of pollution of surface waters used for drinking water supply. Moreover, the removal of nitric acid, nitrate and nitrite ions will produce no higher nitric oxides but, besides carbon dioxide, laughing gas (nitrous oxide) and only small quantities of NO and $N_2$, e.g., 78 vol percent of $CO_2$
16 vol percent of $N_2O$
5 vol percent of NO
1 vol percent of $N_2$.

Most of the NO in this case is generated only towards the end of the process. The gas composition is independent of the acid concentration in the starting solution. This gaseous mixture may be discharged into the ambient air without any additional treatment, e.g., cleaning.

The reaction is performed in a reducing medium, i.e., the waste solution is introduced into a given solution of the reducing agent, preferably into the given 98 percent formic acid, in a batch process or, if the process is carried out continuously, with a small excess of formic acid. The reaction is exothermic and very fast, occurring chiefly according to the equation

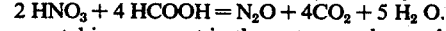

$2 HNO_3 + 4 HCOOH = N_2O + 4CO_2 + 5 H_2O$.

Heavy metal ions present in the water accelerate the reaction so that the induction period, that is the time between the startup of introduction of the waste water into the formic acid heated to 100° C. and the beginning of the reaction, is only a few seconds. This is an advantage, especially if nitric acid, nitrate ions, and nitrite ions are removed from radioactive waste waters, where any risk must be avoided and the reaction must be easily controlled. In prior methods of treating radioactive waste waters with formaldehyde solution or sugar solution, the induction period was between 4 and 10 minutes. Another advantage of the method according to the invention is the independence of the pH of the radioactive waste solution to be treated and the composition of the offgas mixture. The given amount of formic acid depends on the acid concentration of the water. Passing the offgases through scrubber columns is not necessary, passing them through a filter, an iodine filter for instance, is required only if radioactive iodine is contained in the waste water or has been released by compounds in the course of the reaction. Moreover, no additional radioactive waste is produced, which may be the case with nitric acid recovery.

At least in the range between one and four hours for 1,000 ml of waste water, the metering time has no influence on the efficiency of the process. Further heating of the reaction mixture to boiling temperature immediately after metering of the waste water into the formic acid is not necessary, because investigations have shown that only 1 percent of the total offgas volume develops in the first hour of heating after metering and only 0.5 percent after another hour. Contrary to the methods known so far, in the method according to the invention this afterheating is almost without any influence on efficiency. This efficiency is very high and is attained relatively early. Hence, there is also some saving of time as against the old methods. All the nitric acid contained in the waste solution and part of the nitrates, especially the nitrates due to the polyvalent cations (except for alkali and alkaline earth nitrates) are decomposed. At the same time, many cations are reduced to lower valencies, noble metal ions even to the metallic state, and the formation of $RuO_4$ is prevented or such compound is reduced so that no volatile $RuO_4$ can be detected in the offgases. The fine-grained precipitate (Maximum grain size some 0.05 mm) formed in the reaction does not result in deposits on the walls of the vessel which are hard to remove.

In the presence of cation tenside, anion tenside or nonionics up to concentrations of 1 g/l or in the presence of hydrocarbons, butyl phosphoric acids or tributyl phosphate in the waste water no foaming is observed; any addition of antifoaming agents is unnecessary, perhaps even detrimental.

The $H^+$-ion concentrations of the product solutions after metering are very low; investigations showed pH-values between 1.5 and 5.0. The product solutions can be delivered easily with the fine-grained precipitate.

The application of 98 percent formic acid practically does not dilute the reaction mixture by water (only water of reaction is formed), as is the case with the application of formaldehyde or sugar solutions. Moreover, in the reduction with formaldehyde there are two stages of reduction, with sugar there is even a whole number of such stages of reduction, whereas formic acid gives rise to only one stage of reduction. The use of formic acid (the solution of the reducing agent is given) is not possible with the application of formaldehyde and sugar solutions because the remaining unavoidable excess of reducing agent will lead to explosions in the later vitrification step.

During further treatment there are no explosive decomposition phenomena. This means that the method according to the invention has a higher degree of operational safety than most other methods known so far. The apparatus is compact, space saving and simple. Scrubber columns, etc. are not required.

In vitrification of the residue obtained from the product solutions no volatile ruthenium compound is detected.

One of the examples below will show that the method according to the invention can be used successfully also in continuous operation.

EXAMPLE NO. 1

1,000 ml of a synthetic model solution were introduced into 375 ml of 98 percent formic acid in a metering time of four hours. The model solution had this composition:

4    mol $HNO_3$
 0.2  mol $Fe(NO_3)_3$
 0.05 mol $Cr(NO_3)_3$
 0.05 mol $Ni(NO_3)_2$
 0.05 mol $Al(NO_3)_3$
 0.01 mol $Ca(NO_3)_2$.

Since salts were used which had been prepared for technical purposes, the hydrogen ion concentration and the nitrogen content were analyzed before the treatment:

5    mol $H^+$-ions
 4.92 mol N (69mg N/ml).

After the reaction time, 1,080 ml of solution with 4.5 mg N/ml were obtained, i.e., 93 percent of the overall nitrate ion concentration had been destroyed. The product solution had a pH of 3.5 (hence, all the nitric acid had been destroyed) and contained a fine-grained brown precipitate. The volume reduction relative to the sum total of the reaction solutions was 21.5 vol. percent. Some 300 l of offgas were developed during the reaction.

EXAMPLE NO. 2

1,000 ml of a radioactive waste solution produced in the decontamination of equipment of the composition 1.4 mol $H^+$ (given as $HNO_3$)
 1.86 mol N (26 mg N/ml)
 1 mg/ml Arkopal N-130 (non-ionogenic tenside)
 27.7 mg/ml dry residue (dried at 105° C.
 $3 \times 10^{-3}$ μCi/ml α-activity
 $1.7 \times 10^{-3}$ μCi/ml β-activity were introduced into 107 ml of 98 percent formic acid within 4 hours. The volume of the product solution was 1,060 ml (volume reduction 4.2percent, contained 0.63 mg N/ml and had a pH of 2.5. Hence, 97.5 percent $NO_3^-$-ions had been destroyed, which produced 85 l of offgas. Foaming, which had been anticipated because of the presence of Arkopal, did not occur. No volatile radionuclides were detected in the offgases.

EXAMPLE NO. 3

1,000 ml of inactive model solution in a composition of the type produced as a high level waste solution in the Purex process of reprocessing of spent nuclear fuels were treated by the corresponding method, and were introduced into 362 ml of 98 percent formic acid within 4 hours. The solution had the composition:

4.00 mol $HNO_3$
 23.00 g/l Na
 0.92 g/l Rb
 5.45 g/l Cs
 2.23 g/l Sr
 2.72 g/l Ba
 1.15 g/l Y
 18.55 g/l La
 3.77 g/l Ce
 1.35 g/l Pr
 5.20 g/l Nd
 3.68 g/l U as $UO_2(NO_3)_2$
 8.92 g/l Zr
 1.09 g/l Te as $Te_2O_3(OH)NO_3$
 0.02 g/l Cr
 6.69 g/l Mo as $Na_2MoO_4$
 2.40 g/l Mn as a substitute for Tc
 0.10 g/l Fe
 0.01 g/l Ni
 3.09 g/l Ru as $RuNO(NO_3)_3$
 0.84 g/l Rh.

In the composition of the solution the cations were added as nitrates. The analysis of the model solution before treatment indicated 4.75 mol $H^+$
 85.5 mg N/ml (of this, 65 percent as $HNO_3$).

After the reaction, 1,060 ml of product solution were obtained (volume reduction 22.2 percent with 22 mg N/ml (of this, 0.1 mg N/ml as $NH_4^+$) and a pH of 2.8. Hence, 72.8 percent $NO_3^-$-ions had been destroyed, i.e., all the nitric acid and 26 percent of the $NO_3^-$-ions due to the salts. The nitrates of alkali and alkaline earth metals were not decomposed. The formation of $NH_4^+$ was observed only in model solutions containing noble metals. A granular precipitate was formed (32 mg/ml) with a maximum grain size of 0.04 mm. The product solution was easily delivered. 287 l of offgas were produced (at 760 mm Hg).

EXAMPLE NO. 4

As Example No. 1, but the metering time was restricted to 1 hour and afterwards the solution was kept at 100° C. for another hour. Afterwards, the product solution had a nitrogen content of 4.8 mg N/ml and a pH of 2.8. This means that the reduction of the metering time to one hour had no influence on the efficiency of the method.

EXAMPLE NO. 5

A model solution of the same composition as in Example No. 1 was treated in a continuous process. For this purpose, 1 l of an already treated solution was placed in the reaction vessel and heated to boiling temperature. The two reactants were heated to about 98° C. and fed into the reaction vessel, the boiling solution, through a mixer section whose liquid level was kept at 1 l, in the reaction vessel through the use of a siphon. The metering rate in this case was 8.34 ml/min for the model solution and 3.13 ml/min for the formic acid. In this way, 3 l of model solution were treated within 6 hours. The reactants (the process was carried out with an excess of 2 percent formic acid) were introduced in such a way that their sojourn time in the reaction vessel was about 2 hours. After 6 hours the feed was stopped and the experiment was discontinued. The quantities of liquid from the reaction vessel, from the siphon, and the quantity discharged from the latter were mixed and examined. The product solution had a pH of 2.0, the nitrogen content was 5.1 mg N/ml. This implies about 93 percent destruction of the $NO_3^-$-ions.

What we claim is:

1. A method of removing a member selected from the group consisting of nitric acid, nitrate ions, and nitrite ions from an aqueous waste solution containing the member, the method comprising feeding the aqueous waste solution into a heated aqueous solution of a reducing agent; the reducing agent consisting essentially of formic acid and any nitrogen oxide in offgases produced in a reaction of said waste solution with the reducing agent being predominantly $N_2O$.

2. A method according to claim 1 wherein the heated aqueous solution of a reducing agent is boiling.

3. A method according to claim 1 wherein the aqueous waste solution is an aqueous high level radioactive waste solution.

4. A method according to claim 3 wherein the reducing agent consists essentially of 98 percent formic acid and the heated aqueous solution of said reducing agent is boiling.

5. A method according to claim 1 wherein offgases produced in the reaction of said waste solution with said reducing agent are free from higher nitric oxides and the aqueous solution of a reducing agent consists essentially of 98 percent formic acid.

6. A method according to claim 5 wherein the aqueous waste solution is an aqueous high or intermediate level radioactive waste solution.

7. A method according to claim 6 wherein the waste solution is a nitric acid bearing waste solution and the formic acid is in a molar amount which is at least twice that of the hydrogen ion concentration of the nitric acid bearing waste solution.

8. A method according to claim 6 wherein the radioactive waste solution contains radioactive iodine and which comprises passing the offgases through a filter and then discharging them into ambient air.

9. A method according to claim 6 wherein the aqueous waste solution is a high level radioactive waste solution.

10. A method according to claim 9 wherein the heated aqueous solution of a reducing agent is boiling.

* * * * *